United States Patent [19]

Galbraith et al.

[11] Patent Number: 5,233,482
[45] Date of Patent: Aug. 3, 1993

[54] THERMAL ASPERITY COMPENSATION FOR PRML DATA DETECTION

[75] Inventors: Richard L. Galbraith; Gregory J. Kerwin; Joey M. Poss, all of Rochester, Minn.

[73] Assignee: International Business Machines Corporation, Armonk, N.Y.

[21] Appl. No.: 739,020

[22] Filed: Jul. 31, 1991

[51] Int. Cl.⁵ .............................................. G11B 5/09
[52] U.S. Cl. ........................................ 360/46; 360/32
[58] Field of Search ................... 360/32, 46, 50, 66, 360/67

[56] References Cited

U.S. PATENT DOCUMENTS

| | | | |
|---|---|---|---|
| 3,531,789 | 9/1970 | Halfhill et al. | 360/77.02 |
| 3,753,254 | 8/1973 | Ruble et al. | 360/77.02 |
| 4,056,831 | 11/1977 | Godbout et al. | 360/77.02 |
| 4,122,505 | 10/1978 | Kuijk | 360/113 |
| 4,207,601 | 6/1980 | Desai et al. | 360/78.05 |
| 4,635,139 | 1/1987 | Nguyen et al. | 368/25 |
| 4,669,011 | 5/1987 | Lemke | 360/75 X |
| 4,697,213 | 9/1987 | Kitamura | 360/77.02 |
| 4,812,929 | 3/1989 | Stewart et al. | 360/77.07 |

*Primary Examiner*—David Mis
*Attorney, Agent, or Firm*—Joan Pennington; Richard E. Billion; Bradley A. Forrest

[57] ABSTRACT

Apparatus and method of thermal asperity compensation are provided for data detection in a partial-response maximum-likelihood (PRML) data channel. The PRML data channel includes an analog to digital converter (ADC) having a normal operating range and a filter, gain and timing control coupled to the ADC. When a thermal asperity is detected, a thermal asperity recovery mode is established responsive to the detected thermal asperity. The gain and timing control are held and the normal operating range of the ADC is adjusted responsive to the thermal asperity recovery mode. Also an AC coupling pole frequency is elevated responsive to the thermal asperity recovery mode.

17 Claims, 6 Drawing Sheets

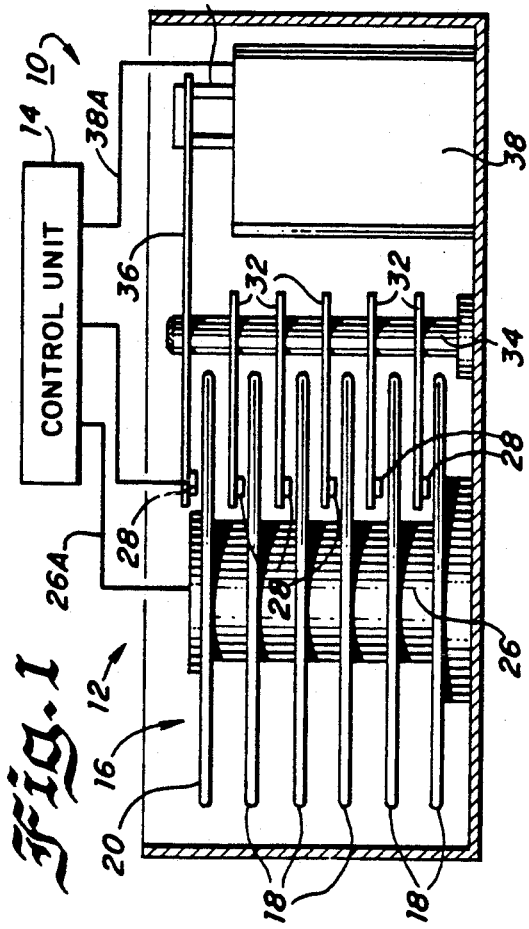

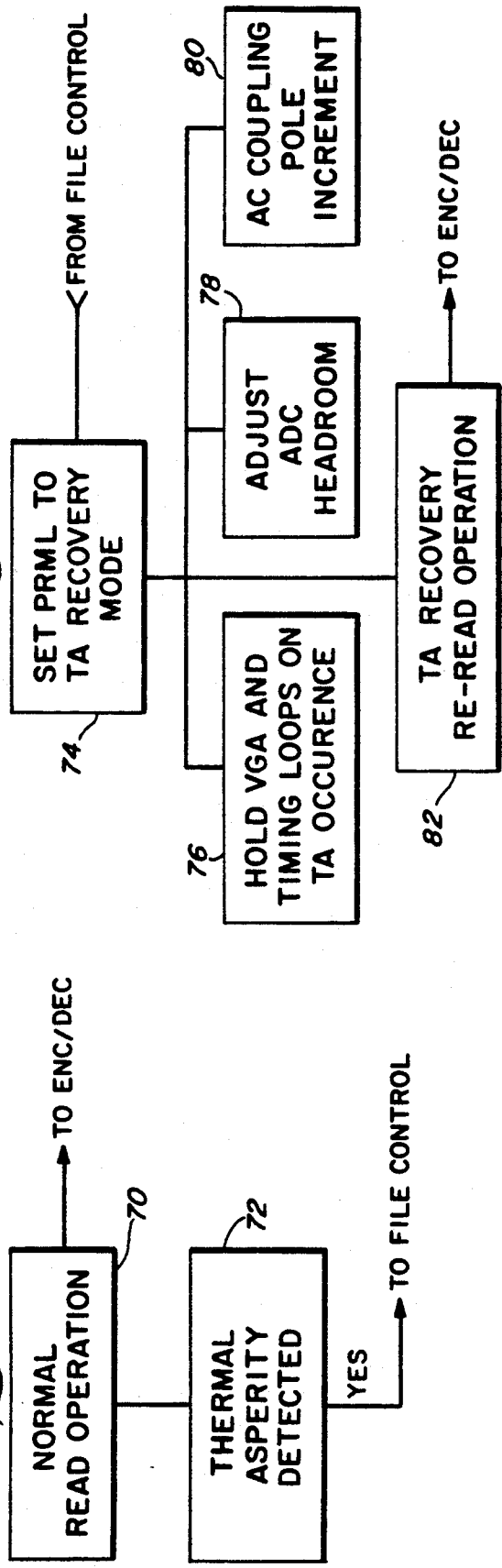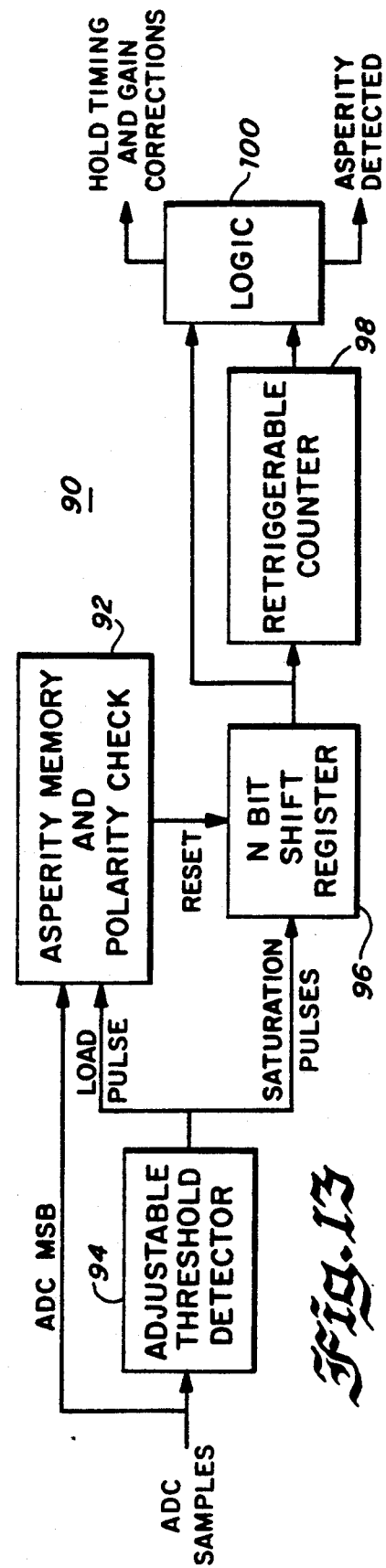

THERMAL ASPERITY COMPENSATION FOR PRML DATA DETECTION

BACKGROUND OF THE INVENTION

1. Field of the Invention

The invention relates generally to a direct access storage device (DASD) of the type utilizing partial-response maximum-likelihood (PRML) detection, and more particularly to a method and apparatus for thermal asperity compensation for PRML data detection.

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. A slider supports one or more magnetic heads. The slider is lightly biased to cause the heads to move toward the recording surface when the disk is stationary; but as the disk is brought up to operating speed, an air bearing is generated which moves each slider and hence the heads away from the recording surface toward a preselected flying height. Achievement of a higher data density on magnetic disks has imposed increasingly narrow transducing gaps.

A magneto-resistive (MR) transducing head exhibits a change in resistance when in the presence of a changing magnetic field. This resistance change is transformed into a voltage signal by passing a constant current through the MR element. The value of DC voltage, for a given head, is the product of the constant bias current and the total resistance between the head lead terminals. The temperature coefficient of resistivity of the MR material is 0.02%/degree C.

A phenomena, termed thermal asperities, can locally increase the strip temperature by more than 100 C. degrees. The cause of this temperature rise is a mechanical collision of the portion of the head containing the MR stripe with a protrusion on the disk surface. Since the change in resistance, as a function of the magnetic field due to read signal in the media, is less than 1% of the total MR stripe resistance, the signal step that is added to the read signal when a thermal asperity is encountered can be greater than twice the base-to-peak read signal. An increase in the temperature of the stripe of 100 C. degrees would cause a resistance change and a voltage change of 2%. When the protrusion on the disk is persistent and the head continues to strike it each revolution, then the data that is being modulated by the resultant thermally induced signal transient will be unreadable without a sufficient error correction code.

Known arrangements for minimizing the effect of thermal asperities on the read data utilize a separate circuit or asperity reduction circuit (ARC) module for additive disturbance transient suppression for data channels. Disadvantages of the know arrangements include the hardware required and the corresponding electronics cost and the required error burst length for a given thermal transient amplitude. The relatively long error site limits its applications. For example, because much more redundancy in the error correcting code or compensation (ECC) is required than is tolerable for small fix-blocked formatted disk drives.

SUMMARY OF THE INVENTION

A principal object of the present invention is to provide improved methods for thermal asperity compensation for PRML data detection in a disk drive data storage system. Other objects are to provide such improved thermal asperity compensation methods substantially without negative effects, further that eliminates the need for a separate ARC module, that enables a smaller error burst length for a given thermal transient amplitude and that enables an increase in file capacity with less required ECC redundancy as compared to prior art arrangements, and that overcome many of the disadvantages of prior art arrangements.

In brief, the objects and advantages of the present invention are achieved by method and apparatus for thermal asperity compensation for data detection in a partial-response maximum-likelihood (PRML) data channel. The PRML data channel includes an analog to digital converter (ADC) having a normal operating range and a filter, gain and timing control coupled to the ADC. When a thermal asperity is detected, a thermal asperity recovery mode is established responsive to the detected thermal asperity. The gain and timing control are held and the normal operating range of the ADC is adjusted responsive to the thermal asperity recovery mode. Also an AC coupling pole frequency is elevated responsive to the thermal asperity recovery mode.

BRIEF DESCRIPTION OF THE DRAWING

The present invention together with the above and other objects and advantages may best be understood from the following detailed description of the embodiment of the invention illustrated in the drawings, wherein:

FIG. 1 is a schematic and block diagram of a data storage disk file embodying the present invention;

FIG. 2 is a diagram showing the accessing mechanism for a single disk surface of the apparatus of FIG. 1;

FIG. 3 is a diagram illustrating apparatus a PRML data channel for carrying out thermal asperity compensation according to methods of the present invention in the data storage disk file of FIG. 1;

FIGS. 4A and 4B together provide a flow diagram illustrating a thermal asperity compensation method according to the present invention in the data storage disk file of FIG. 1;

FIG. 13 is a diagram illustrating apparatus for detecting thermal asperities.

DETAILED DESCRIPTION OF THE PREFERRED EMBODIMENT

Figure 5:
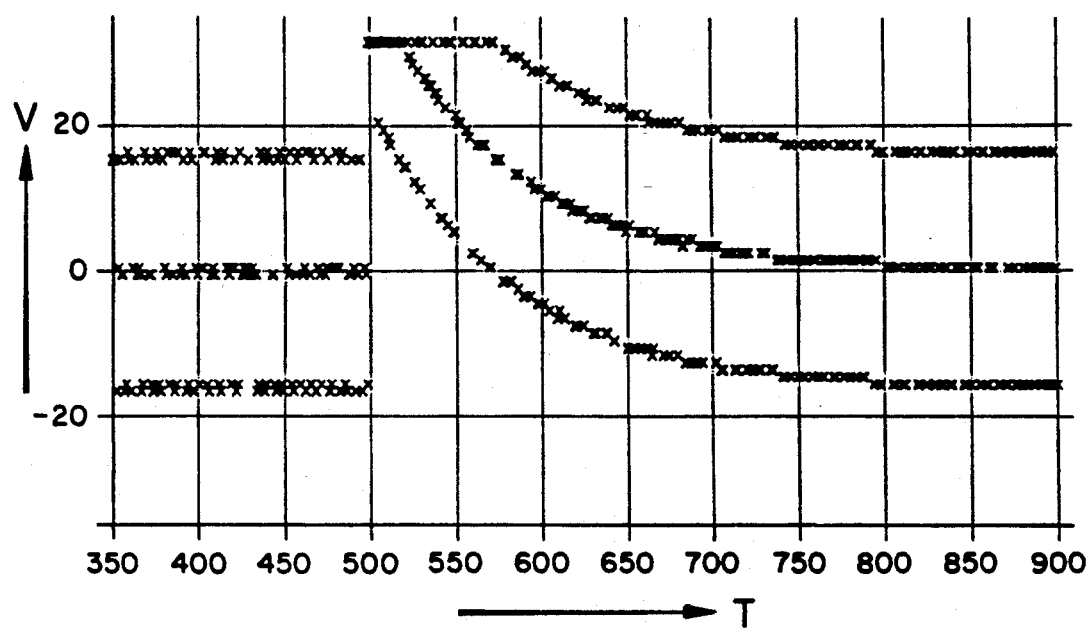
FIGS. 5, 6, 7, 8, 9, 10, 11 and 12 are graphs to illustrate the operation of thermal asperity compensation methods of the present invention.

In FIG. 1 there is shown a partly schematic block diagram of parts of a data storage disk file 10 including a data storage medium generally designated as 12 and an interface control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 39 cooperating with a magnet and core assembly (not seen) operatively controlled for moving the transducer heads 28 in synchronism in a radial direction in order to position the heads in registration with data cylinders to be followed. The VCM is movable within a fixed magnetic field, and the direction and velocity of the coil movement is controlled by the current supplied.

During operation of the disk file 10, the rotation of the disks 18 generates an air bearing between the heads 28 and the disk surfaces 20. This air bearing thus counterbalances the slight spring force of the suspensions 30 and supports the transducer heads 28 off the disk surfaces during normal operation.

The various components of the disk file 10 are controlled in operation by signals generated by control unit 14 such as motor control signals on line 26A and position control signals on line 38A.

In accordance with the feature of the present invention, thermal asperity compensation is an integrated function of a partial-response maximum-likelihood (PRML) recording channel 40 available in the disk file 10.

Referring now to FIG. 3, there is shown a block diagram of the PRML data channel 40 for carrying out thermal asperity compensation methods of the invention. The PRML recording channel uses class IV partial-response (PR) signals accomplished by a PR-IV filter function. Data to be written is applied to an encoder 42 for providing a modulation coded output having predefined run length constraints, such as for the minimum and maximum number of consecutive zeros and the maximum run length of zeros in the even and odd recorded sequences in the overall recorded sequence. A precoder 44 follows the encoder 42 described by a $1/(1-D^2)$ operation where D is a unit delay operator. A PRML precomp 46 coupled to the precoder 44 provides a modulated binary pulse signal applied to a write circuit 48 that provides the modulated write current for writing to the disk surface. An analog read signal is obtained at head and disk block 50 described by the $(1-D^2)$ operation. The read signal is applied to a variable gain amplifier (VGA) 52. The amplified read signal is applied to a lowpass filter 54. The filtered read signal is converted to digital form by an analog to digital converter (ADC) 56 that provides, for example, 64 possible 6-bit sampled values.

The samples of the ADC 56 are applied to a digital filter 58, such as a 10 tap finite impulse response (FIR) digital filter, and are applied to a gain and timing control 60. The gain and timing control 60 provides a gain and ac coupling pole control signal to the VGA 52 and provides a timing control signal to the ADC 56 via a voltage controlled oscillator 62. The filtered signal from the digital filter 58 is applied to a Viterbi decoder 64 coupled to a decoder 66 to complete the maximum-likelihood (ML) detection process for data read back.

In accordance with the invention, expanded headroom of the ADC 56 is provided in the PRML data detection when attempting to recover data that has been distorted by the additive noise source resultant form a thermal asperity (TA). Accompanying this expanded ADC headroom is the capability to change the translation of the expected values associated with partial response class IV signalling. Expanded ADC headroom is accomplished by reducing both the expected sample values and the analog input by a selected factor. The resultant recovery read operation is performed with a decrease in the wideband signal to noise ratio in order to gain in signal to correlated noise ratio over a specific TA disturbed data area. This results in a greater probability of recovering all of the data in the record.

FIGS. 4A and 4B provides a flow diagram illustrating the thermal asperity compensation method. A normal read operation is indicated at block 70 and a thermal asperity detected is indicated at a block 72. Upon the detection of a TA at block 72, the channel control 14 is notified. Control unit 14 then places the PRML channel into a read TA recovery mode as indicated at a block 74. Typically gain and timing loops are quite sensitive to the additive DC transient produced by a thermal asperity. A hold circuit 76 is employed to keep these loops inactive for the duration of the TA. To minimize the time that these loops need to be held the coupling pole frequency 80 can be elevated. The VGA and timing loops are held over the asperity as indicated at block 76 and the ADC headroom in adjusted for the entire record read as indicated at a block 78. To reduce the settle time of the transient and, therefore the time that the gain and timing loops must be held, an increase in the coupling pole frequency advantageously is enacted as indicated at block 80. A TA recovery reread operation is performed as indicated at a block 82, multiple read operations can compensate for the lost signal to noise which results from the lower resolution of the ADC 56. As in the case on the lower resolution ADC, the soft error rate will be slightly elevated due to the higher coupling pole frequency; however, multiple rereads during the recovery procedure will more than compensate for the increased soft error rate.

Figure 6:
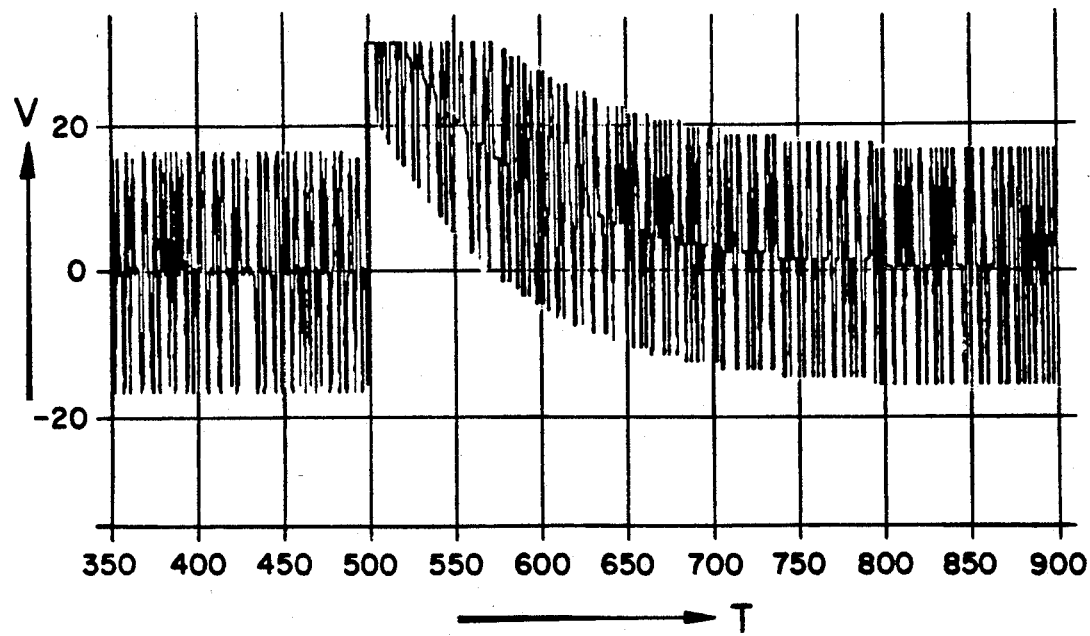

FIGS. 5 and 6 illustrate a given asperity condition during normal operation of ADC 56 with lines connecting sample points in FIG. 6. Expected values V are shown relative to the vertical axis between ±20 and time values T are shown relative to the horizontal axis. As shown, a thermal asperity begins at T500 and returns to the expected value range at about T680.

Figure 7:
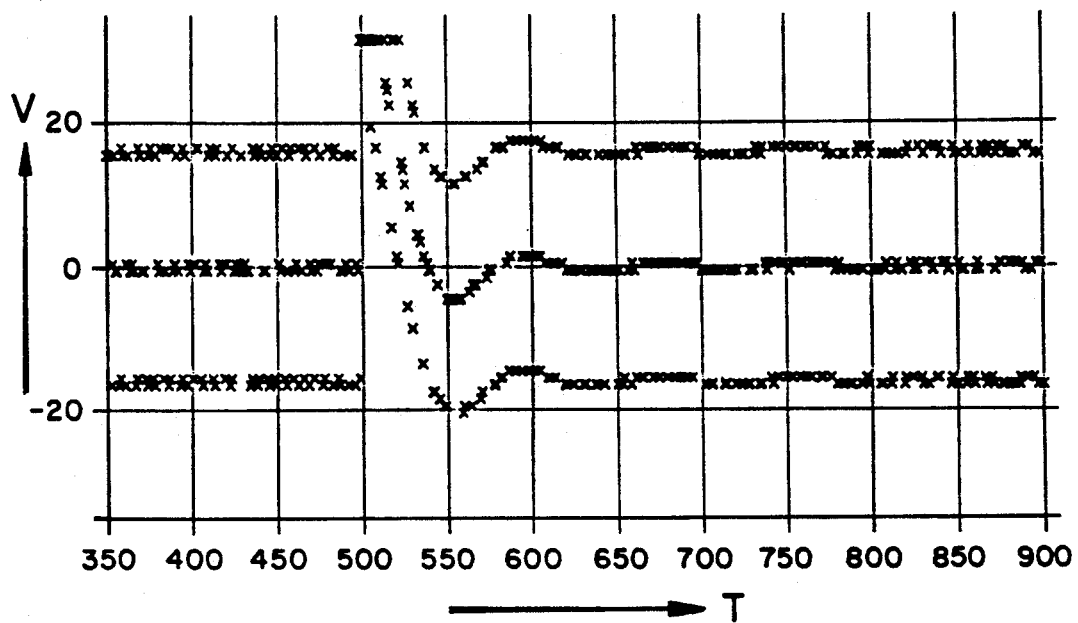
Figure 8:
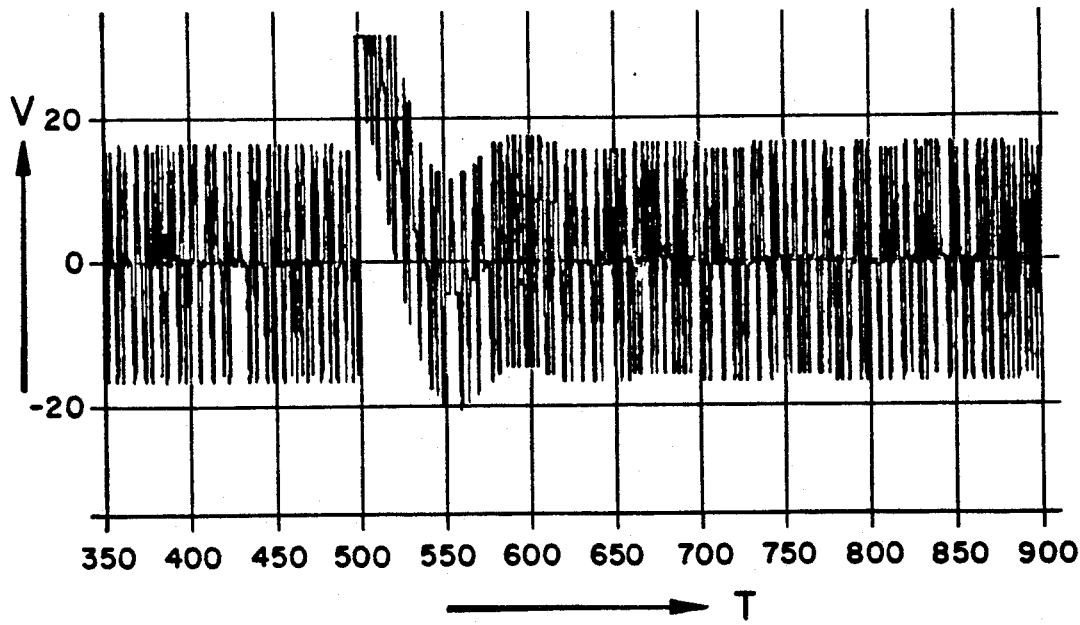
Figure 9:
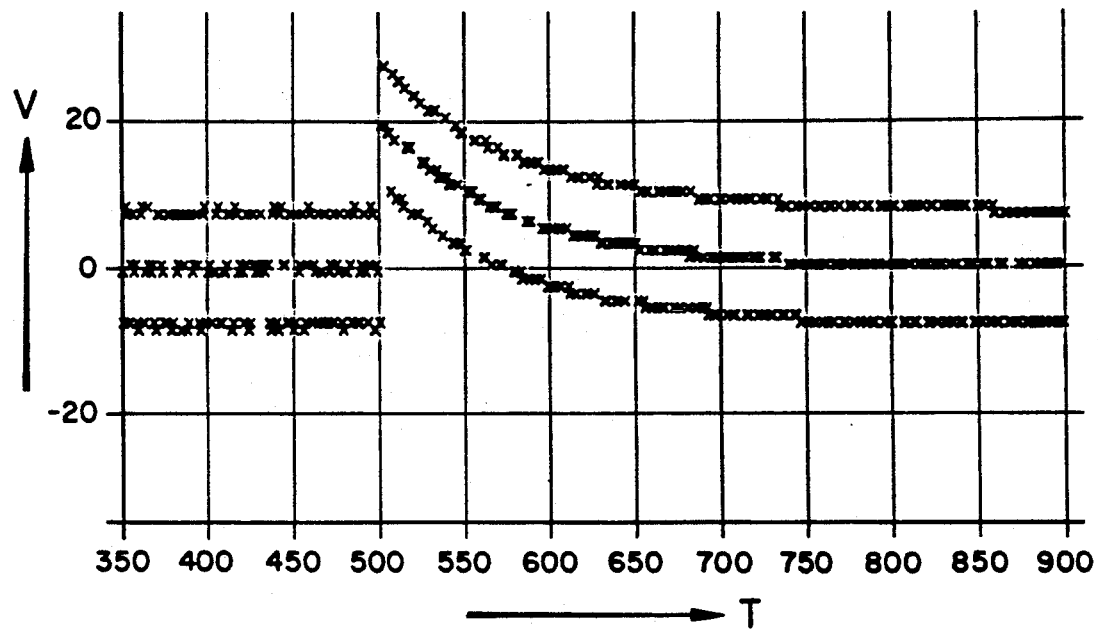
Figure 10:
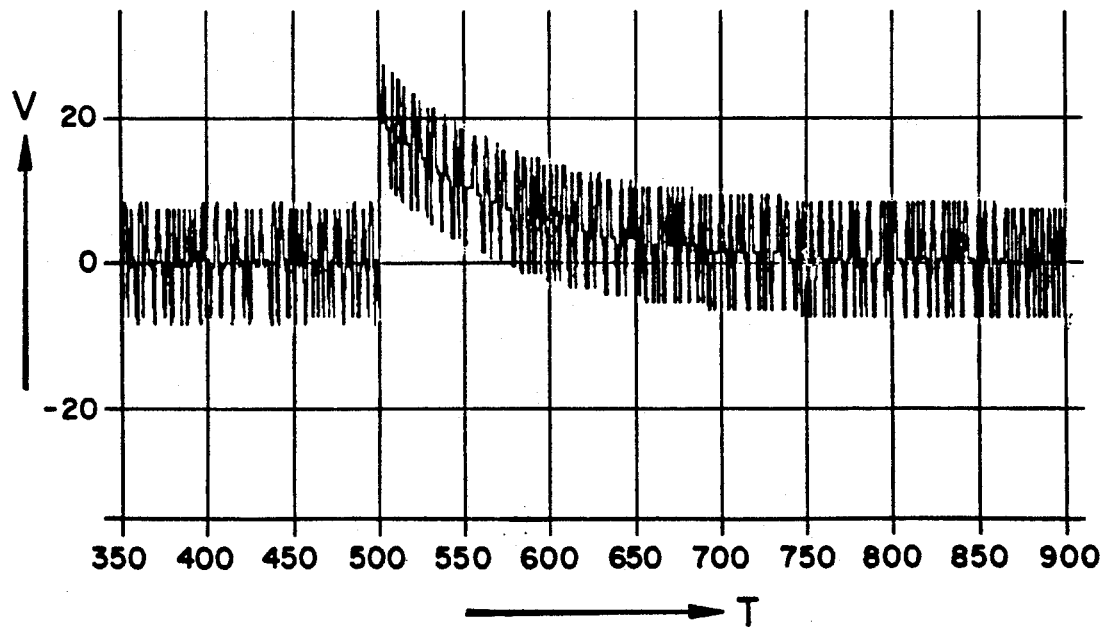
Figure 11:
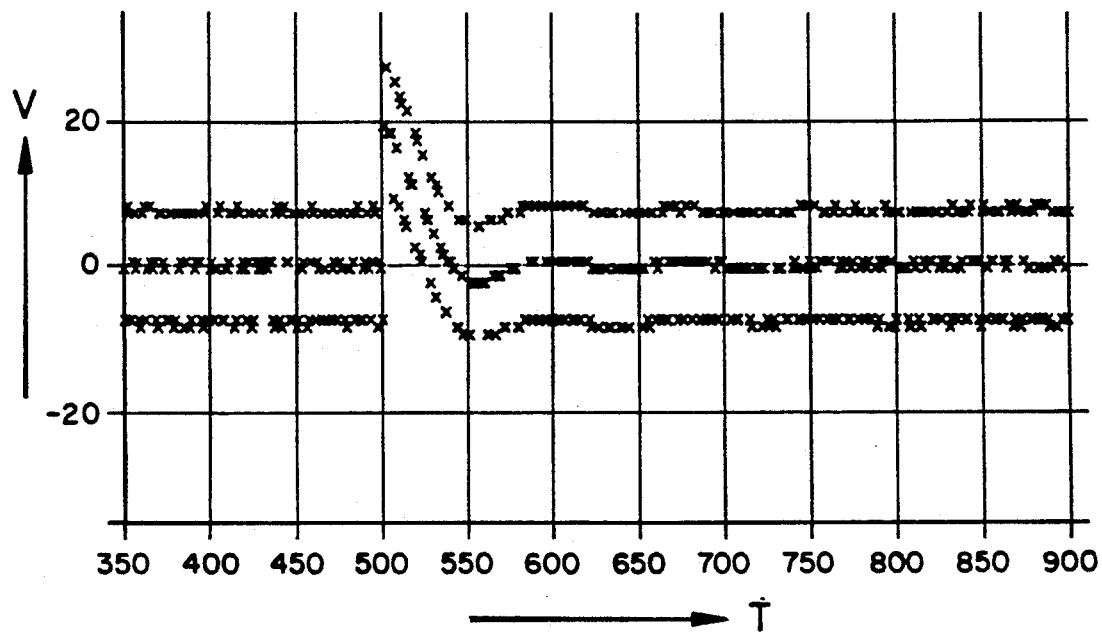
Figure 12:
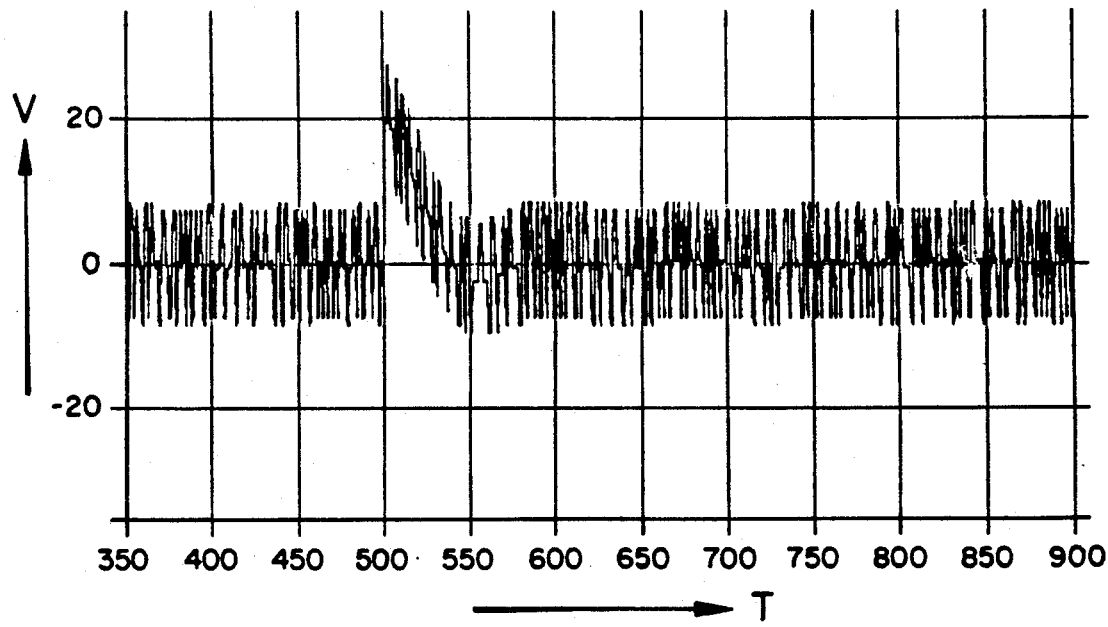

FIGS. 7 and 8 illustrate corresponding graphs by incrementing the AC coupling pole frequency. FIGS. 9 and 10 show corresponding graphs with expansion of the headroom in the ADC 56. FIGS. 11 and 12 show corresponding graphs with both expanded ADC headroom and increased AC coupling pole frequency.

As shown in FIGS. 9, 10, 11 and 12 the small signal amplitude entering the ADC 56 is reduced by a factor of two and the expected value is redefined by that same factor during the TA recovery mode. The transient caused by a thermal asperity can be a factor of two larger before it begins to saturate the ADC range. If a DC invariant detection scheme like the Viterbi algorithm is used, the error burst length will be defined as the time between the start of the transient and the time that the signal returns within the ADC range.

With normal ADC operation the simulated thermal asperity depicted in FIGS. 5 and 6 has an error burst length between about T500 and T680 or approximately equal to the time that the signal remains outside of the expected normal range of the ADC for the non-thermal asperity mode. With expanded ADC headroom depicted in FIGS. 9 and 10, an error burst extends between T500 and T540 or approximately equal to the rise time of the thermal asperity in the expanded headroom mode. In FIGS. 11 and 12 delay is reduced with both expanded ADC headroom and increased AC coupling pole frequency, providing an error burst between T500 and T520. When the signal, as shown in this example, does not exceed the ADC range the error burst length is minimized to that portion of the TA disturbance (thermal heating or asperity rise time) for which the Viterbi detection scheme can not compensate.

FIG. 13 shows a block diagram of the thermal asperity detector 90 that can be utilized for thermal asperity compensation with the present invention. A read signal anomaly is caused by an additive transient asperity signal in terms of the relative amplitude of the sample values from the ADC 56. A sequence of sample values are defined that are indicative of the effective samples that would be present for thermal additive transient of a specific amplitude. Since a thermal asperity causes a shift in the baseline of the read signal, at some TA amplitude ADC samples will saturate. As the amplitude of the TA increases, the length of the sample burst containing saturated values also increases. The magnitude of a TA can then be categorized by the length of the burst of samples that contain saturated values. The TA magnitude that will be detected by the channel can be selectively varied by varying the allowable length of the sample burst containing saturated values that can occur before identifying the anomaly as a TA. If a small burst is required then a relatively small amplitude TA will be sensed. This will also result in a higher probability of identifying a TA when the saturated sample values were a result of some other effect. Conversely, a large TA identification will more assuredly be correctly made if the allowable burst is long indicating a larger TA. The chances of this large burst being the result of some other effect other than a TA will be small. Thermal asperity detector 90 efficiently detects thermal asperities having amplitude sufficient to warrant invoking TA recovery compensation by sensing a selected number of saturated samples to define an asperity condition.

An asperity memory and polarity check 92 receives a most significant bit from the ADC 56 at a line labelled ADC MSB. An adjustable threshold detector 94 receives samples from the ADC 56 and senses whether the samples have saturated in either the positive or negative direction. The adjustable threshold detector 94 can be adjusted to accommodate changes in the ADC range. Changing the ADC range is used to minimize the impact of a thermal asperity on the recording channel. If one or more saturated samples are detected, one or more corresponding pulses are outputted from the adjustable threshold detector 94 indicated at a line labelled as SATURATION PULSES. The SATURATION PULSES are applied to the asperity memory and polarity check 92 at a line labelled LOAD PULSE to latch and hold the ADC MSB. The ADC MSB indicates the polarity of the thermal asperity.

The SATURATION PULSES also are applied to an N bit shift register 96 which validates the thermal asperity. When the ADC MSB changes state before the SATURATION PULSES reaches the Nth cell of the shift register, this indicates an unexplained polarity change from the ADC samples and the thermal asperity is invalid. The asperity memory and polarity check 92 is used to indicate this change in polarity and will reset the shift register causing no further processing of the SATURATION PULSES.

Otherwise when the SATURATION PULSES reach the Nth cell of the shift register 96, a retriggerable counter 98 starts. The counter 98 will output an N bit pulse length which is applied to a logic block 100 to hold the gain and timing corrections of the PRML recording channel 40 during the thermal asperity. If the thermal asperity is relatively large it will retrigger the counter 98 to hold the timing and gain corrections longer. Logic block 100 provides an ASPERITY DETECTED pulse indicating a thermal asperity has been detected with the pulse length indicating the relative size of the thermal asperity. As the thermal asperity decays, the ADC MSB will change state. The ADC MSB state change will reset the shift register 96 and the counter 90 continues to run for a fixed number of bit times marking the end of the timing and gain corrections hold.

In summary, four functions have been added to the sampling detector of the PRML data channel for thermal asperity compensation including asperity detection, ADC head room expansion, gain and timing loop hold, and coupling pole frequency increment.

What is claimed and desired to be secured by Letters Patent of the United States is:

1. A method of thermal asperity compensation for data detection in a data channel including an analog to digital converter (ADC) having a normal operating range, filter, gain and timing control coupled to the ADC, said method comprising the steps of:
   detecting a thermal asperity;
   establishing a thermal asperity recovery mode responsive to said detected thermal asperity;
   holding the gain and timing control responsive to said thermal asperity recovery mode; and
   adjusting a normal operating range of the ADC responsive to said thermal asperity recovery mode.

2. A method as recited in claim 1 further comprising the step of:
   incrementing an AC coupling pole frequency responsive to said thermal asperity recovery mode.

3. A method as recited in claim 1 wherein the step of detecting a thermal asperity includes the steps of:
   detecting an amplitude of the sample values from the ADC; and
   comparing said detected amplitude with a predefined threshold value to identify a thermal asperity.

4. A method as recited in claim 1 wherein the step of detecting a thermal asperity includes the steps of:
   detecting an amplitude of a plurality of sample values from the ADC; and
   comparing said plurality of detected amplitudes with a predefined threshold value to identify a thermal asperity.

5. A method as recited in claim 4 further including the steps of:
   detecting the polarity of the thermal asperity; and invalidating a detected thermal asperity responsive to a change in said detected polarity before said plurality of sample values are detected.

6. A method as recited in claim 1 wherein said step of establishing a thermal asperity recovery mode responsive to said detected thermal asperity includes the step of:
reducing the analog signal input to the ADC by a selected factor; and wherein said step of adjusting a normal operating range of the ADC utilizes said selected factor.

7. A method as recited in claim 1 wherein multiple rereads are performed over the detected asperity.

8. Apparatus for thermal asperity compensation for data detection in a partial-response maximum-likelihood (PRML) data channel including an analog to digital converter (ADC) having a normal operating range, filter, gain and timing control coupled to the ADC, said apparatus comprising:
means for detecting a thermal asperity;
means for establishing a thermal asperity recovery mode responsive to said detected thermal asperity;
means for holding the gain and timing control responsive to said thermal asperity recovery mode; and
means for adjusting a normal operating range of the ADC responsive to said thermal asperity recovery mode.

9. Apparatus as recited in claim 8 further comprising:
means for incrementing an AC coupling pole frequency responsive to said thermal asperity recovery mode.

10. Apparatus as recited in claim 8 wherein said means for detecting a thermal asperity include:
means for sampling values from said ADC; and
means for threshold comparing said sampled values to detect said thermal asperity.

11. Apparatus as recited in claim 8 wherein said means for holding the gain and timing control responsive to said thermal asperity recovery mode; and said means for adjusting a normal operating range of the ADC responsive to said thermal asperity recovery mode are provided by a channel interface control unit.

12. Apparatus as recited in claim 8 wherein said means for adjusting a normal operating range of the ADC responsive to said thermal asperity recovery mode includes means for adjusting an analog signal coupled to said ADC by a selected factor; and wherein said normal operating range of the ADC is adjusted by said selected factor.

13. Apparatus as recited in claim 12 wherein said selected factor equals two.

14. A direct access storage device of the type including a partial-response maximum-likelihood (PRML) data channel comprising:
a housing;
at least one disk mounted in said housing for rotation about an axis and having at least one disk surface for storing data;
transducer means mounted for movement across said disk surface for reading and writing data to said disk surface;
an analog to digital converter (ADC) coupled to said transducer means for converting an analog input signal to digital sample values within a normal operating range;
filter, gain and timing control means coupled to said ADC for controlling the ADC;
means coupled to said ADC for threshold comparing said digital sample values to detect a thermal asperity;
means for establishing a thermal asperity recovery mode responsive to said detected thermal asperity;
means for holding the gain and timing control means responsive to said thermal asperity recovery mode; and
means for adjusting said normal operating range of said ADC responsive to said thermal asperity recovery mode.

15. A direct access storage device as recited in claim 14 further comprising:
means for incrementing an AC coupling pole frequency responsive to said thermal asperity recovery mode.

16. A direct access storage device as recited in claim 14 further comprising means for reducing said analog input signal to said ADC by a selected factor and wherein said normal operating range of said ADC is adjusted by said selected factor.

17. A direct access storage device as recited in claim 14 further comprising:
means responsive to said thermal asperity recovery mode for performing multiple reread operations over said detected asperity.

* * * * *